United States Patent
Proschowsky et al.

(10) Patent No.: US 12,014,562 B2
(45) Date of Patent: Jun. 18, 2024

(54) METHOD AND SYSTEM FOR AUTOMATIC SPEAKER FRAMING IN VIDEO APPLICATIONS

(71) Applicant: GN Audio A/S, Ballerup (DK)

(72) Inventors: Morten Smidt Proschowsky, Værløse (DK); Sui Kun Guan, Union City, CA (US); Nihit Rajendra Save, Mountain View, CA (US); Aurangzeb Khan, Portola Valley, CA (US)

(73) Assignee: GN AUDIO A/S (DK)

( * ) Notice: Subject to any disclaimer, the term of this patent is extended or adjusted under 35 U.S.C. 154(b) by 67 days.

(21) Appl. No.: 17/184,558

(22) Filed: Feb. 24, 2021

(65) Prior Publication Data

US 2022/0269882 A1  Aug. 25, 2022

(51) Int. Cl.
| | |
|---|---|
| *G06K 9/00* | (2022.01) |
| *G06T 7/20* | (2017.01) |
| *G06T 7/70* | (2017.01) |
| *G06V 10/25* | (2022.01) |
| *G06V 20/40* | (2022.01) |
| *G06V 40/10* | (2022.01) |

(Continued)

(52) U.S. Cl.
CPC ............ *G06V 40/10* (2022.01); *G06T 7/20* (2013.01); *G06T 7/70* (2017.01); *G06V 10/25* (2022.01); *G06V 20/49* (2022.01); *G10L 17/00* (2013.01); *G10L 25/57* (2013.01); *H04N 5/2628* (2013.01); *G06T 2207/10016* (2013.01); *G06T 2207/20084* (2013.01); *G06T 2207/20132* (2013.01); *G06T 2207/30196* (2013.01); *H04R 1/406* (2013.01); *H04R 3/005* (2013.01)

(58) Field of Classification Search
CPC ....................................................... H04N 7/15
See application file for complete search history.

(56) References Cited

U.S. PATENT DOCUMENTS

| | | | |
|---|---|---|---|
| 6,275,258 B1 * | 8/2001 | Chim | H04N 7/142 348/169 |
| 8,903,130 B1 | 12/2014 | Careroni et al. | |

(Continued)

FOREIGN PATENT DOCUMENTS

EP    3 287947 A1    2/2018

OTHER PUBLICATIONS

Extended European Search Report Applic No. 22158453.5-1208.
Rachel Heck et al, Virtual Videography, Univ of Wisconsin, Madison, Feb. 1, 2007.

*Primary Examiner* — Hadi Akhavannik
(74) *Attorney, Agent, or Firm* — Vanintheran Moodley, Esq.

(57) ABSTRACT

For video applications, a method for dynamically switching from a current ROI to a target ROI is disclosed, wherein the target ROI only includes active speakers. Advantageously, if the target ROI crops a non-speaker, then the target ROI is expanded to include said non-speaker. Transitioning from the current ROI to the target ROI may be achieved based on a cutover transition technique, or a smooth transition technique. The cutover transition technique achieves the change from the current arrived to the target ROI in a single interval, whereas the smooth transition technique achieves the change over a number of intervals, wherein a percentage of the total change required is allocated to each interval. A system for implementing the above method is also disclosed.

13 Claims, 9 Drawing Sheets

(51) Int. Cl.
  *G10L 17/00*   (2013.01)
  *G10L 25/57*   (2013.01)
  *H04N 5/262*   (2006.01)
  *H04R 1/40*    (2006.01)
  *H04R 3/00*    (2006.01)

(56) References Cited

U.S. PATENT DOCUMENTS

| | | | |
|---|---|---|---|
| 10,778,941 B1 * | 9/2020 | Childress, Jr. | H04N 7/155 |
| 2006/0251382 A1 * | 11/2006 | Vronay | H04N 7/147 |
| | | | 386/280 |
| 2010/0039497 A1 * | 2/2010 | Cutler | H04N 7/18 |
| | | | 348/E7.083 |
| 2018/0063482 A1 * | 3/2018 | Goesnar | H04N 7/15 |
| 2018/0253629 A1 * | 9/2018 | Bamba | G06F 18/2148 |
| 2019/0356883 A1 | 11/2019 | Theien et al. | |
| 2020/0193628 A1 * | 6/2020 | Chakraborty | G06F 18/217 |

* cited by examiner

METHOD AND SYSTEM FOR AUTOMATIC SPEAKER FRAMING IN VIDEO APPLICATIONS

FIELD

Embodiments of the present invention relate generally to video processing.

BACKGROUND

Video corresponding to a scene being imaged may comprise multiple objects, not all of which may be of interest to a viewer. This may especially be the case for video shot at a wide field of view (FOV). For example, consider a large conference room with say twelve people sitting around the table. In this case the FOV may cover all 12 people, however there may be a need to narrow the field of view down to a selected region of interest (ROI), for example, corresponding to only those conference participants who are actively speaking.

SUMMARY

According to the first aspect of the invention days provided a method for framing video comprising associating a current region-of-interest (ROI) corresponding to video of a scene being imaged;
detecting speakers in the scene;
performing a reframing operation comprising dynamically calculating a target region of interest (ROI), wherein the target ROI is generated based on active speakers in the scene; and
transitioning to the target ROI from the current ROI based on one of a cutover transition technique and a smooth transition technique.

A system for implementing the above method is also provided.

Other aspects of the invention, will be apparent from the written description below.

DETAILED DESCRIPTION

In the following description, for purposes of explanation, numerous specific details are set forth in order to provide a thorough understanding of the invention. Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Virtual Director

Embodiments of the present invention disclose an audio/visual (AV) device comprising a virtual director component configured to identify a speaker in the field-of-view of the AV device, and to frame said speaker in a manner similar to how a human director would have done. Advantageously, the virtual director component tracks speaker in a natural way and continuously monitors who is speaking based on visual and audio cues.

In one embodiment the virtual director may use artificial intelligence (AI) algorithms the process video to locate people in a video with respect to the camera. AI algorithms may also be used on audio to determine the azimuth location of the speaker with respect to microphones of the AV device.

AV device with Virtual Director Component

Figure 1:
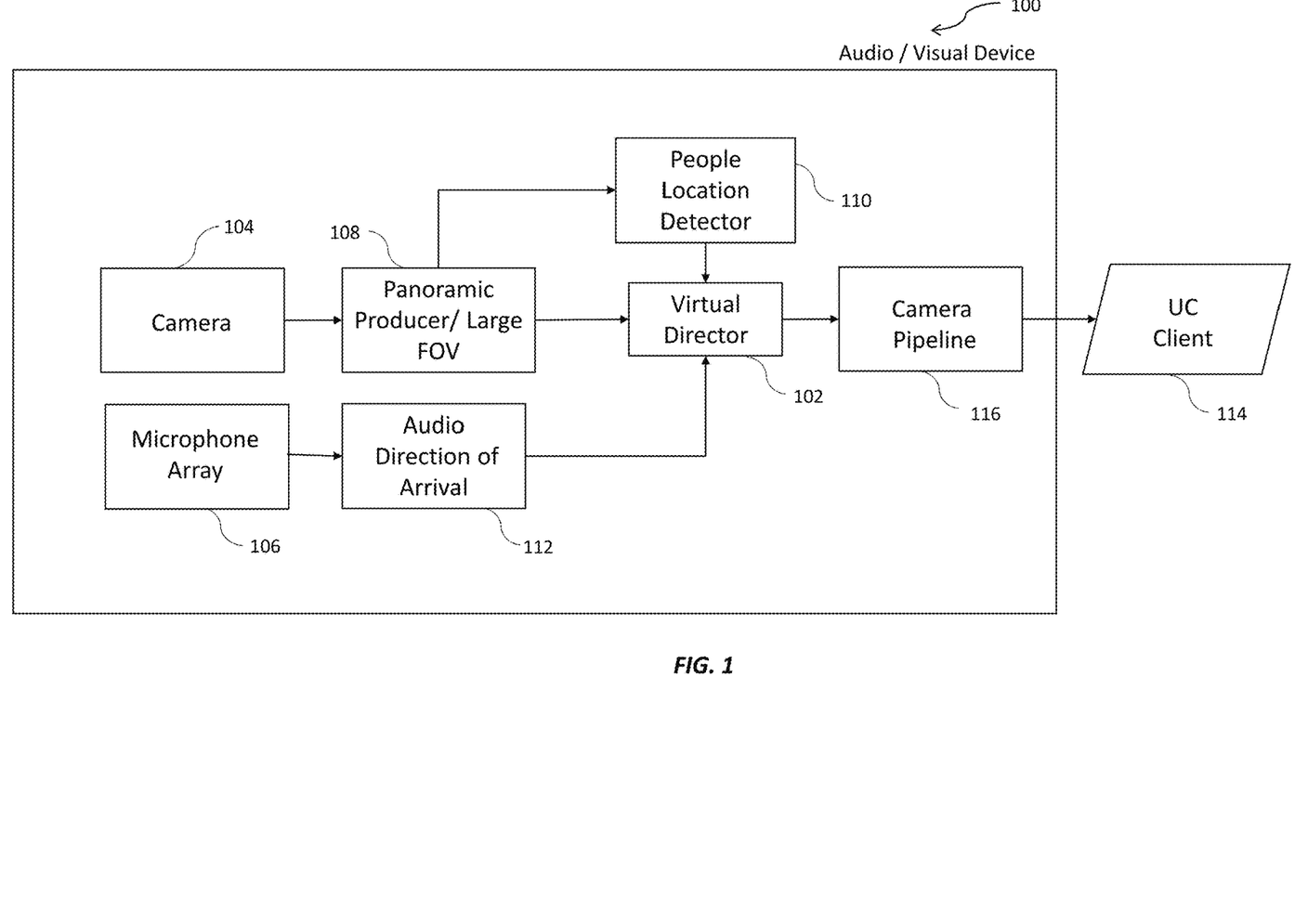
FIG. 1 shows a high-level block diagram of an audiovisual device for framing video, in accordance with one embodiment of the invention.

FIG. 1 of the drawings shows an AV device 100 comprising a virtual director module 102 which may be implemented as a software/firmware module. In accordance with different embodiments, the AV device 100 device may comprise a camera 104 (which has video and audio capture capabilities), a video-bar (a camera that has video capture and audio capture and playback facilities), or an all-in-one (a device which has a camera, audio capture and playback and a compute unit which runs a universal communication (UC) client).

The AV device 100 comprises a camera 104 which may be a single-lens or a multi-lens system that produces a panoramic or a large FOV video 108. The AV device 100 further comprises a built-in microphone array 106.

The large FOV or panoramic video 108 is fed into a people location detector 110 which detects the location of the people in the field-of-view of the camera 104. The people location detector 110 may execute various techniques including artificial intelligence and machine learning (AI/ML) based techniques or traditional digital signal processing (DSP) based techniques to compute the location of the people. An audio direction-of-arrival (DOA) module 112 determines the location of the currently active speaker in the field-of-view of the camera 104 using the audio signals from the microphone array 106. The module 112 may also use AI/ML techniques or traditional DSP based techniques to compute the DOA. The people location and the DOA information is fed to the virtual director module 102 along with the video. The virtual director module 102 then determines the most optimal view, as will be described later, that would be presented to a UC client 114 configured, for example, to accept the curated video from the video through a universal serial bus (USB) or a wired/wireless interface. In some embodiments, the UC client 114 may be built into the AV device 100.

In some embodiments, the curated video output by the virtual director 102 may be further processed in a camera pipeline 116 before being sent to the UC client 114.

The video frame rate of the camera 104 may be 30 frames per second (corresponding to 33 msec between each frame) and the detection is run at 10 frames per second (corresponding to 100 msec between detections), and frame dimensions may be 3840×1080 pixels.

Figure 2:
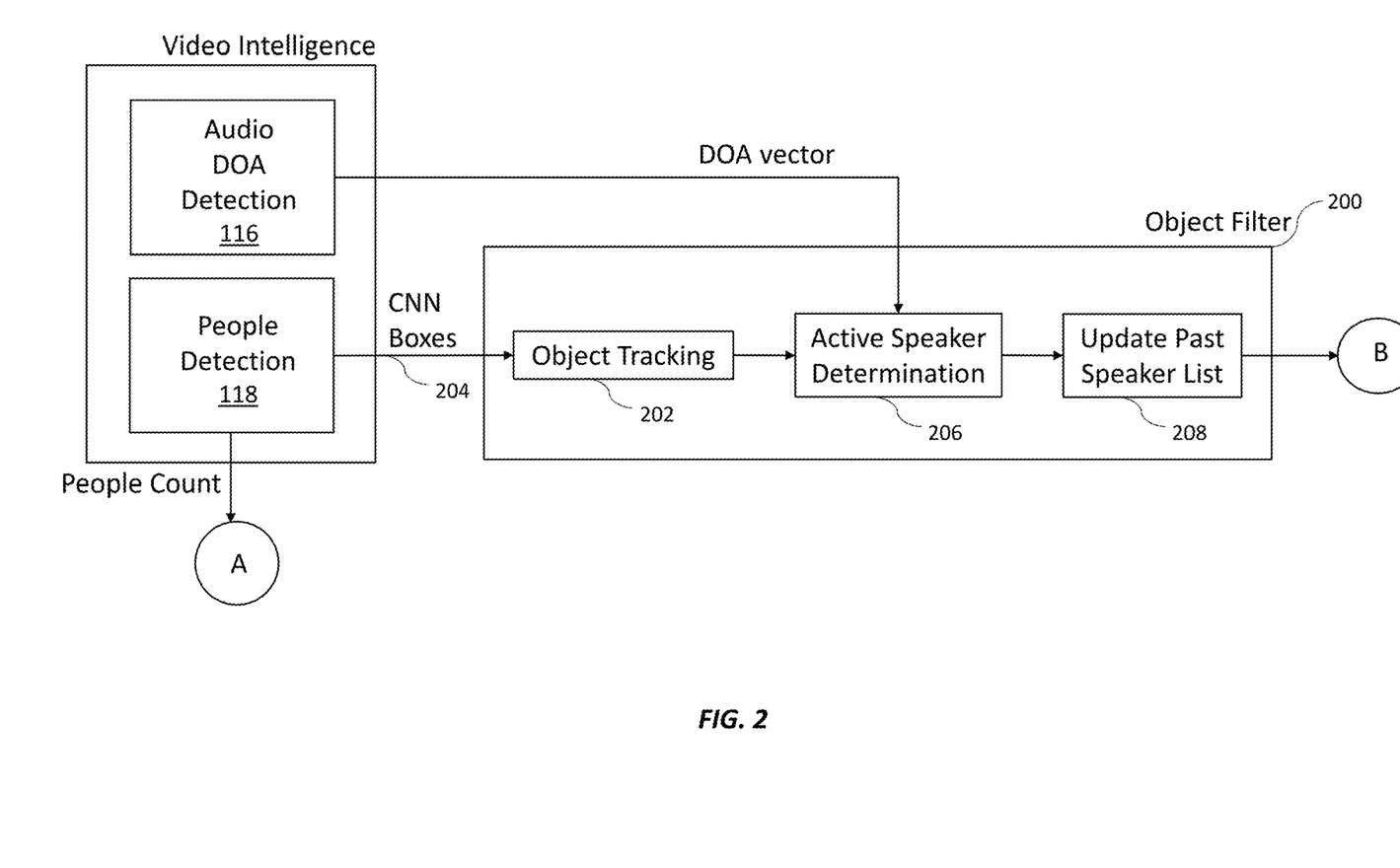
FIG. 2 shows a flowchart of operations for object filtering in accordance with one embodiment of the invention.

FIG. 2 of the drawings shows a flowchart of operations performed by the virtual director 102, in accordance with one embodiment of the invention, to produce the curated video. Referring to FIG. 2 an object filter sub-block 200 is responsible for tracking people using both, the people detector information from the module 110 and the DOA information from the module 112. The sub-block 200 outputs a list of bounding boxes of people in the video. The object filter sub-block 200 may be configured to execute a heuristic-based techniques to perform the following:

(a) Filtering of false audio direction based on video detection and VAD (Voice Activity Detection). Based on the audio frequency, the module 200 is configured to use VAD algorithms to detect if the sound belongs to human voice. Thus, non-human sounds, and other noises will be ignored.

(b) Filtering of false positive people detection based on heuristics including but not limited to box sizes, box movements. In one embodiment, the box size is determined by the distance of the person from the camera 104. For example, in one embodiment, the use case of a maximum distance is chosen to be 18 feet from the camera and the minimum distance is chosen to be 3 feet from the camera, with the result that people standing beyond this range will be ignored. This also determines the sizes of the boxes that will be accepted and the sizes that will be ignored. In one embodiment, the size of the box is determined by finding out the size of a human face/body at a particular distance in the camera's frame. Yet another technique to eliminate false positives is to detect the position of the face rectangle in the image, and if the face rectangle is determined to be below a certain height threshold, then it is eliminated. For example, for a frame height of 1080 pixels (with 0 at the top), and if the face rectangle's y position is above 1000 pixels, then the face rectangle is rejected.

(c) Filtering of false negative face/body detection based on box tracking—allows boxes to be disappear between frames. Typically, bounding boxes (human) movements are minimum between frames, i.e., the motion of the bounding box does not change that much within the detection interval of 100 msec, so boxes can be tracked by matching with the list of new bounding boxes based on their center (matching with closest center). For the box that does not have a match, it will not be removed immediately but only be removed after a one second (configurable duration).

(d) In some cases, filtering of false negative people detection may be based on color characteristics of the missing faces/bodies between two successful face/body detections.

In one embodiment, for execution of the above further techniques, the object filter 200 further includes sub-blocks comprising an object tracking block 202 wherein object tracking is performed for people detected in the video. The people detection module 118 may be configured to execute deep learning techniques to identify people in the scene being imaged. A first output of the people detection module 118 comprises a plurality of people-bounding boxes generated based on convolutional neural network (CNN) features. This output is indicated by reference numeral 204 and serves as an input to the object tracking box 202.

In one embodiment, the object tracking block 202 may be configured to track a person's face, and body separately. For face tracking, face-bounding boxes are tracked, whereas for body-tracking, body-bounding boxes are tracked.

The object filter sub-block 200 also includes block 206 wherein an active speaker determination process is performed to determine the current active speaker(s) in the video based on DOA information received from the audio DOA detection module 116. In one embodiment, to facilitate determining the current active speaker(s) the module 116 may be configured to output DOA vectors to the module numeral 206.

If a person who was flagged as an active speaker is no longer an active speaker, then that person is placed on a past speaker list which is updated at block numeral 208.

As previously noted, the virtual director 102 generates curated video by dynamically framing selected portions of a scene. For example, in the context of a meeting, the virtual director 102 will dynamically frame only those speakers who are currently flagged as active speakers. Thus, in one embodiment, the virtual director 102 comprises a target ROI calculator configured to calculate a target region of interest (ROI) which contains only the active speakers based on the bounding boxes produced by the object filter 200. In one embodiment, the ROI calculator outputs the ROI region to be the current or next target.

In one embodiment, inputs to the target ROI calculation algorithm comprises a list of speaker boxes and a list of people boxes. Boxes are represented as top left corner (x0, y0), and bottom right corner (x1,y1). A few aspects of the ROI calculation algorithm will now be described:

(a) The algorithm will add padding (e.g., 30% of the width and 10% of height) to all the boxes to account for the width of a person's shoulder.

(b) The algorithm identifies the zoom and pan value (or equivalently, the width and center of the ROI) based on the left most and right most x coordinates from the list of speaker boxes.

(c) The algorithm adjusts the width until the selected ROI does not cut through a body bounding box. This ensures that the final view will not clip people.

(d) The algorithm uses the topmost y coordinates to identify the tilt value. By comparing this topmost y value with previous value, if the difference is greater than certain threshold (e.g. 200 pixels), then the algorithm will consider it has significant changes in y position. Similarly, the algorithm compares the current ROI center and width with previous ROI center and width, and classifies it into one of the four categories: zoom in, zoom out, left shift, and right shift, and then for each of the category, if the changes in width are greater than certain threshold (e.g., 200 pixels, and each category can have its own thresholds), the algorithm will consider it has significant changes in pan.

(e) Finally, if pan has significant changes, the algorithm will check the time difference between now and last zoom and pan adjustment. If the time since last zoom and pan adjustment both are greater than N seconds (e.g., 5 seconds), the algorithm will update the zoom and pan value as the new ROI zoom & pan target. Similarly, if the tilt changes our significant and the time since the last tilt adjustment greater than N seconds (e.g., 4 seconds), the algorithm will update the tilt target of the new ROI.

Figure 3:
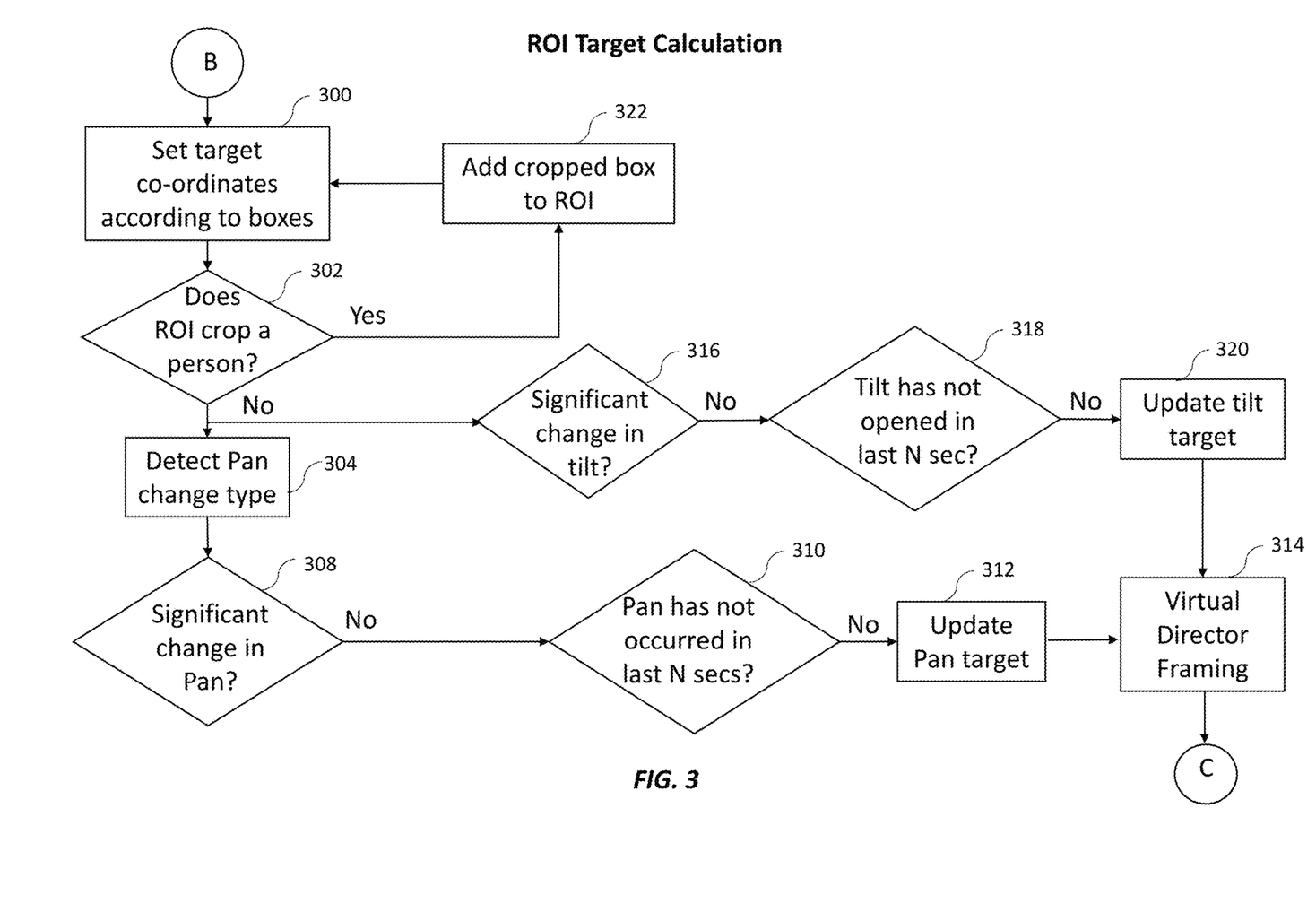
FIG. 3 shows a flowchart of operations for video framing in accordance with one embodiment of the invention.

Keeping the foregoing in mind, FIG. 3 of the drawings shows a flowchart of operations performed by target ROI calculator, in accordance with one embodiment of the invention. Referring to FIG. 3, at block 300, the target ROI is set based on the coordinates of the active speaker bounding boxes received from the DOA detection module numeral 116. At block 302, a check is made to determine if the target ROI crops a person. If the ROI does not crop a person then control passes to block 304 where a pan change typed is detected. Typically pan changes may be selected from the group comprising types: zoom in; zoom out; left shift; and right shift.

Block 308 checks if the pan amount is significant, and block 310 checks if a pan change has occurred in the last N seconds. Only if the pan change is considered not significant, and a pan change has not occurred within the last N seconds, block 312 executes wherein the pan target is updated and control passes to a virtual director framing block 314.

Control from the block 302, for cases where the ROI does not crop a person, also passes to block 316 wherein a determination is made as to whether a change in tilt is considered significant. For cases where the change in tilt is not considered significant, control passes to block 318 where a check is made to see if a change in tilt has not occurred in the last N seconds. If no change in tilt is accorded in last N seconds, then control passes to block 320 wherein the tilt target is updated.

If at block 302 it is determined that the ROI crops a person then block 322 executes wherein the bounding block that was cropped is added to the target ROI and control passes back to block 300.

In one embodiment, the virtual director 102 comprises a framing module configured to frame the ROI region produced the ROI calculator. Advantageously said framing block may be configured to generate a smooth or cutover transition from one ROI region to another based on speaker activity. Functional capabilities of the framing module in accordance with one embodiment comprise:
(a) a computation to ensure that people's bodies and faces are not clipped in the final output. This is ensured by the target ROI calculation algorithm that when framing on active speakers it ensures that it does not clip other people or otherwise those people will also be included to the framing.
(b) adaptive transition between multiple speakers by first zooming out to include the previous and current speaker, then zooming back to current speaker. This is ensured by the object filter that it won't immediately remove the previous active speaker boxes from the list until certain time has passed (e.g., 7 seconds). Therefore, during speaker transition, both old and new active speakers will be presented by the object filter algorithm.
(c) use of a combination of smooth and instant transition when changing the views.
(d) the application of continuity editing on framing and transition.

In one embodiment, the framing block utilizes a technique configured to control the framing based on differences between the current ROI and the target ROI thereby to ensure an optimal user experience when switching from the current ROI to the target ROI. One aspect of controlling the framing comprises insuring that the elapsed time between last ROI change and the current one will not exceed the minimum threshold time, e.g., 5 seconds. If the time since the last ROI update is more the minimum threshold time and there is a new target ROI ready, the overlap between current ROI (which should have reached to the same as previous target ROI) and the new target ROI is determined to see if the overlap is large or not. For example, in one embodiment the intersection over union (IoU) between the current ROI and the target ROI is determined. If the IoU is more than certain threshold (e.g., 70%), this means that the overlap is large, a condition which implies that the current ROI and the target ROI are close to each other. For this case, the framing technique/algorithm will use a smooth transition involving the use of intermediate frames between the current and the target ROI to reach to the new target ROI. For the case where the current ROI and the target ROI are not close, the framing algorithm switch to the target ROI instantaneously, that is to say without the use of intermediate frames to reach the new target ROI.

Figure 4:
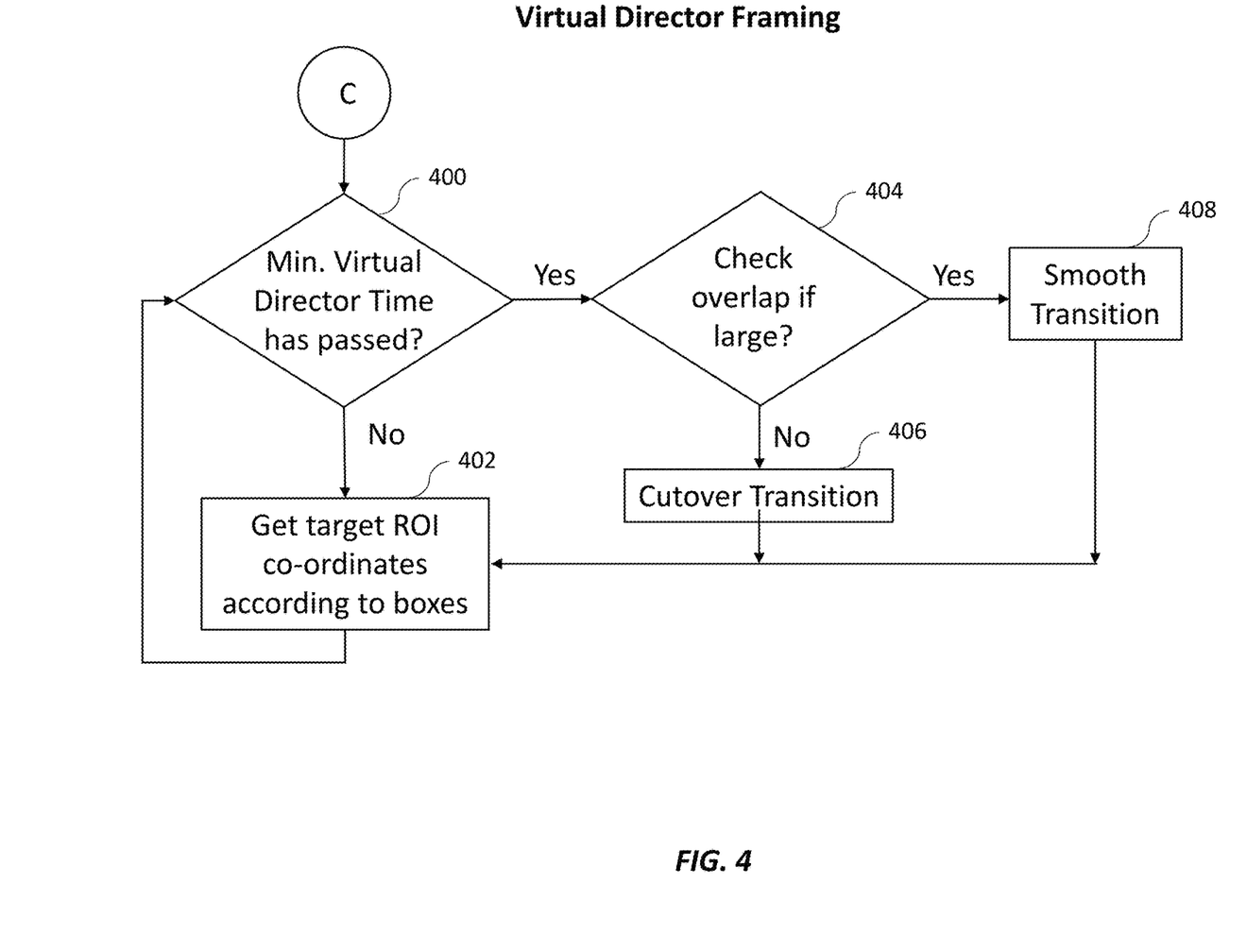
FIG. 4 shows a flowchart of operations for a smooth transition to a target region of interest, in accordance with one embodiment of the invention.

Turning now to FIG. 4 of the drawings, there is shown a flowchart of the framing technique described above, in accordance with one embodiment. As will be seen, at block 400 a check is made to determine if a minimum time as elapsed since the last ROI target change occurred. As noted above, the minimum time could be five seconds. For cases where we had the minimum time as not yet elapsed, control passes to block 400, where the framing block continues to receive new target ROI coordinates, and the check at block 400 is repeated.

If at block 400 determined that the minimum time has indeed elapsed, then control passes to block 404 where a check is made to determine if the overlap between the current ROI, and the target ROI is large. As explained above, if the overlap is not large, then cutover transition techniques executed at block 406, otherwise smooth transition techniques executed at block 408.

Figure 5:
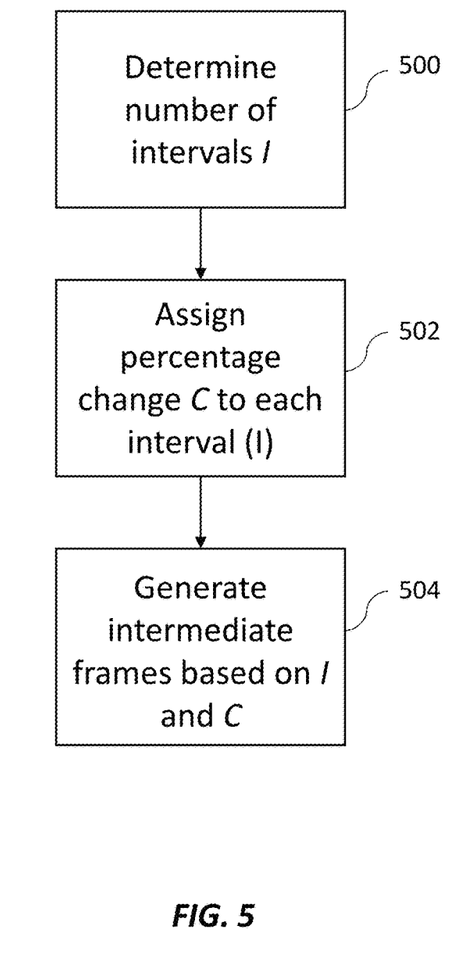
FIG. 5 illustrates a technique for achieving a smooth transition to a target ROI frame, in accordance with one embodiment of the invention.

In one embodiment, the technique for achieving a smooth transition to the target ROI frame may comprise generating a series of intermediate frames between the current ROI frame, and the target ROI frame in a non-linear fashion according to the steps outlined in FIG. 5 of the drawings. Referring to FIG. 5, at block 500 and a number of intervals I that will be used for transition from the current ROI to the target ROI is determined. At block 502, a percentage of the total change C between the current ROI frame, and the target ROI frame is assigned to each interval I. For example, if two intervals are used, 80% of the change may be assigned to the first interval, and 20% of the change assigned to the remaining interval, thus making the total transition nonlinear. At block 504, the required intermediate frames are then generated based on the values for I, and C.

Figure 6A:
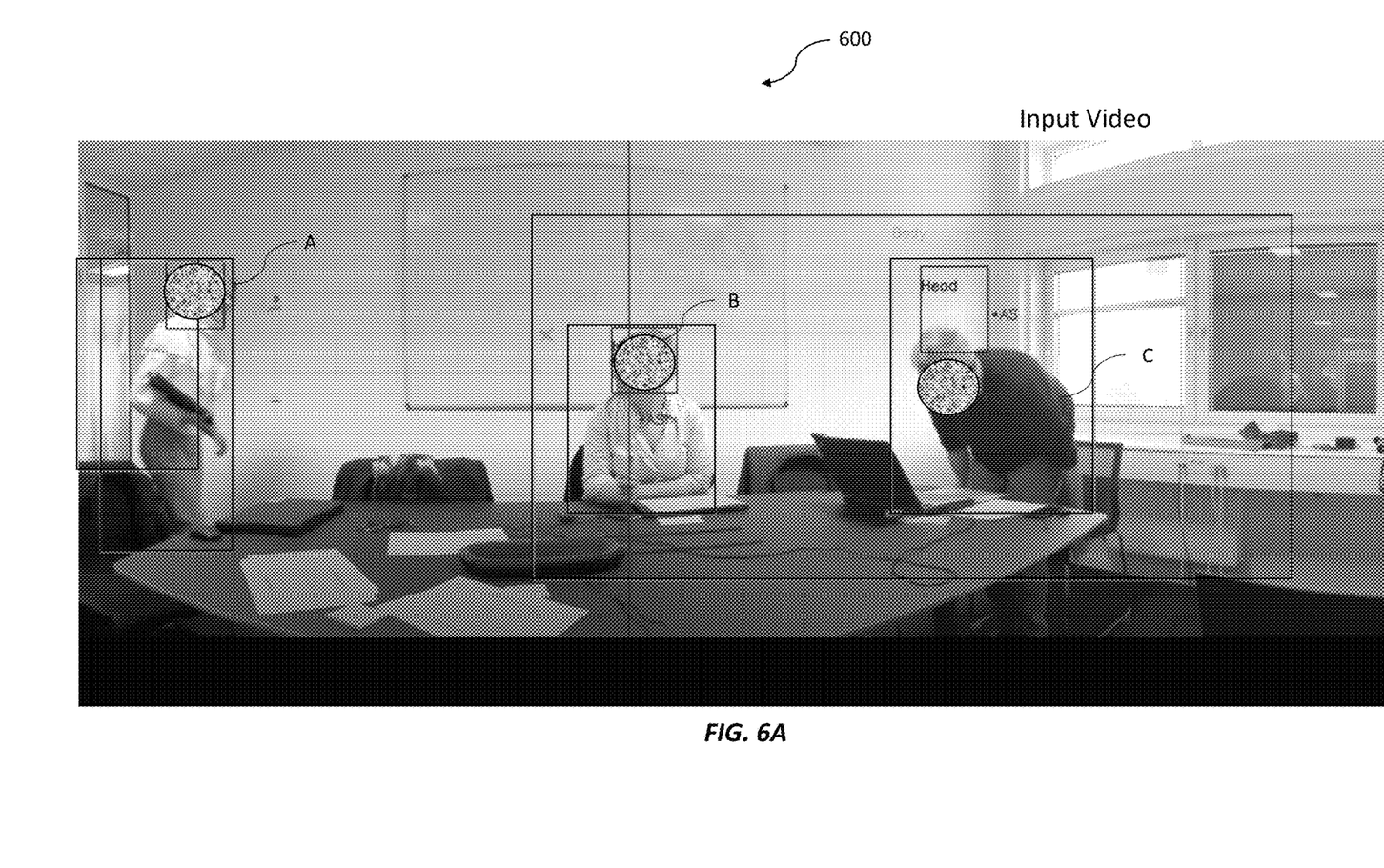
FIGS. 6A-D show how the virtual director frames video relating to a videoconference, in accordance with one embodiment of the invention (Note faces are obfuscated to protect privacy of the people in the video).
Figure 6B:
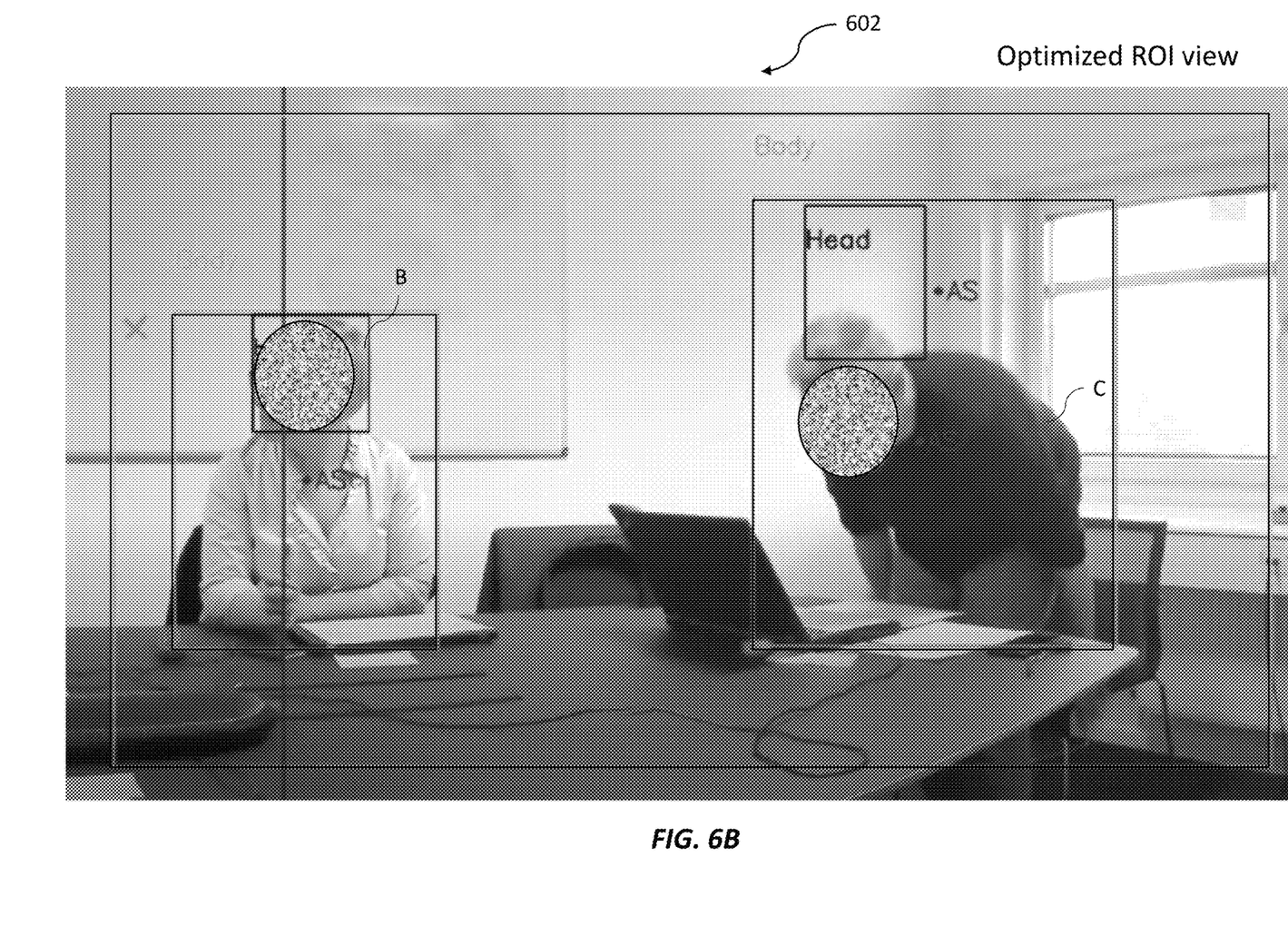
Figure 6C:
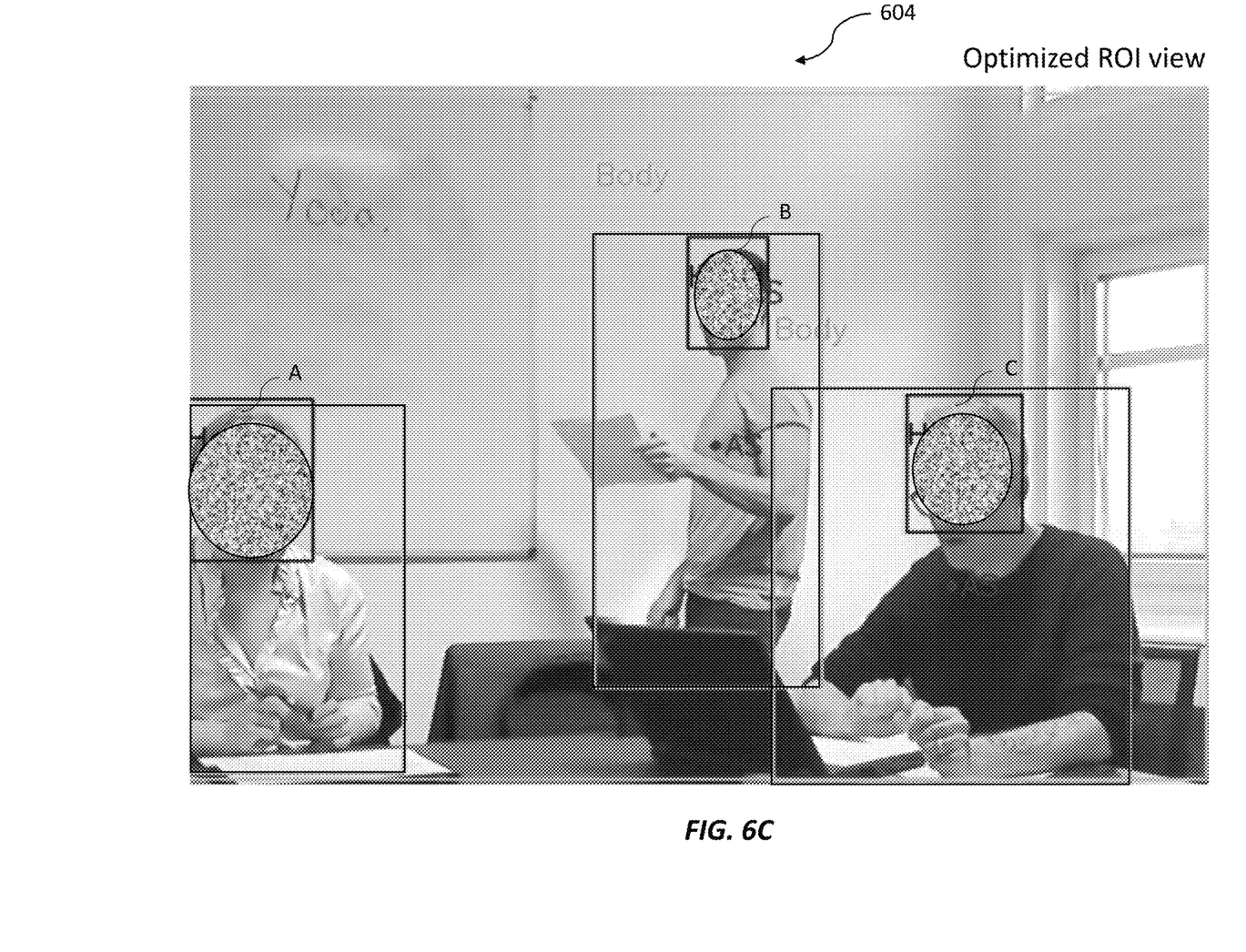

Advantageously, the techniques disclosed herein may be used to dynamically calculate target ROI's, for an example of a videoconference, based on active speakers, and to transition to said target ROIs in a fashion that provides an optimal user experience. For example, consider an input video 600 shown in FIG. 6A of the drawings. The video 600 shows a videoconference in which the speakers, labeled A, B, and C, respectively can be seen. Each speaker has a face bounding box and a body bounding box generated in accordance with the techniques disclosed herein. If speakers B and C active, then the virtual director 102 will generate an optimized ROI view 602 shown in FIG. 6B of the drawings, wherein only speakers B and C are seen in a zoomed-in view.

Figure 6D:
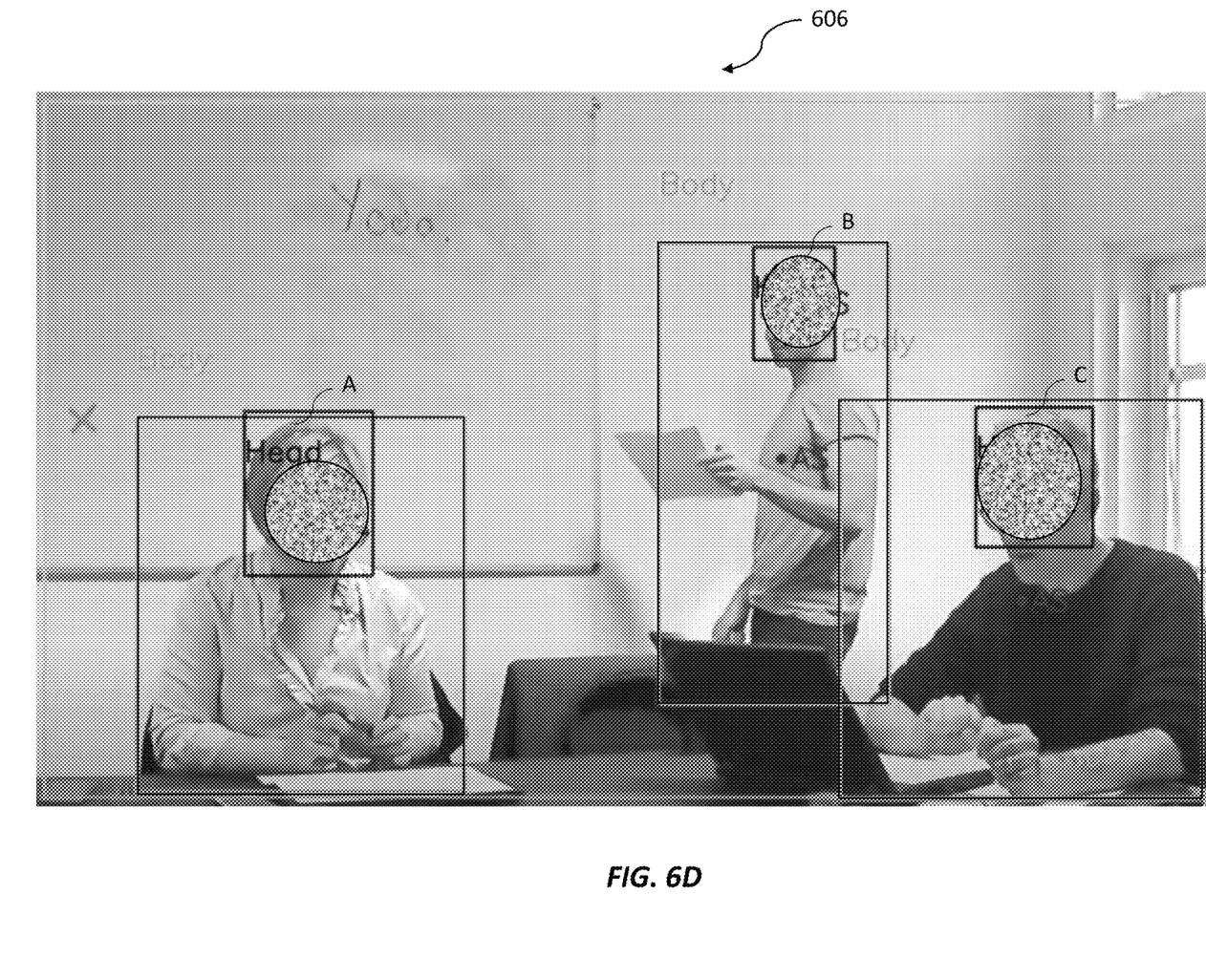

Now consider the frame 604 shown in FIG. 6D of the drawings. Here once again there are speakers labeled A, B, and C, respectively. However, a target ROI around active speakers B and C can be seen to crop the speaker A. Provided such cropping, the body bounding box for speaker A is added to the target ROI with the result that frame 606 shown in FIG. 6D is produced where in an optimized target ROIs produced in which the speaker A is not cropped.

As will be appreciated by one skilled in the art, the aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way

The invention claimed is:

1. A method for framing video, comprising:
    associating a current region-of-interest (ROI) corresponding to video of a scene being imaged;
    detecting audio signals associated with the scene;
    determining active speakers in the scene based on the detected audio signals;
    performing a reframing operation comprising dynamically calculating a target region of interest (ROI), wherein
        the target ROI is generated based on coordinates associated with a bounding box calculated for the determined active speakers in the scene, and
        the target ROI is expanded to include a non-speaker when the target ROI crops the non-speaker;
    calculating a degree of overlap between the current ROI and the target ROI, wherein the calculating the degree of overlap between the current ROI of the target ROI comprises determining an intersection over union (IoU) between the current ROI and the target ROI; and
    based on the calculated degree of overlap, transitioning to the target ROI from the current ROI using one of a cutover transition technique and a smooth transition technique.

2. The method of claim 1, wherein said transitioning comprises executing the cutover transition technique if the degree of overlap between the current ROI and the target ROI is smaller than a threshold and executing the smooth transition technique if said degree of overlap is greater than said threshold.

3. The method of claim 1, wherein the smooth transition technique comprises:
    calculating the total change required to transition from the current ROI to the target ROI;
    determining a number of intervals over which to achieve said transition; and
    allocating said total change to each interval.

4. The method of claim 3, wherein a location of the total change across the intervals is non-linear.

5. The method of claim 3, wherein the cutover transition technique comprises allocating the total change to a single interval.

6. The method of claim 1, wherein each bounding box is calculated based on convolutional neural network (CNN) features.

7. A system, comprising:
    a camera for capturing video;
    a microphone; and
    a virtual director module configured to perform a method for framing video captured by the camera, the method comprising:
    associating a current region-of-interest (ROI) corresponding to video of a scene being imaged;
    detecting audio signals associated with the scene, wherein the audio signals are detected by the microphone;
    determining active speakers in the scene based on the detected audio signals;
    performing a reframing operation comprising dynamically calculating a target region of interest (ROI), wherein
        the target ROI is generated based on coordinates associated with a bounding box calculated for the determined active speakers in the scene, and
        the target ROI is expanded to include a non-speaker when the target ROI crops the non-speaker;
    calculating a degree of overlap between the current ROI and the target ROI, wherein the calculating the degree of overlap between the current ROI of the target ROI comprises determining an intersection over union (IoU) between the current ROI and the target ROI; and
    based on the calculated degree of overlap, transitioning to the target ROI from the current ROI using one of a cutover transition technique and a smooth transition technique.

8. The system of claim 7, wherein said transitioning comprises executing the cutover transition technique if the degree of overlap between the current ROI and the target ROI is smaller than a threshold and executing the smooth transition technique if said degree of overlap is greater than said threshold.

9. The system of claim 7, wherein the smooth transition technique comprises:
    calculating the total change required to transition from the current ROI to the target ROI;
    determining a number of intervals over which to achieve said transition; and
    allocating said total change to each interval.

10. The system of claim 9, wherein a location of the total change across the intervals is non-linear.

11. The system of claim 9, wherein the cutover transition technique comprises allocating the total change to a single interval.

12. The system of claim 7, wherein each bounding box is calculated based on convolutional neural network (CNN) features.

13. The method of claim 1, wherein the target ROI is generated further based on a size of the bounding box and movements of the bounding box.

* * * * *